United States Patent [19]

Müller

[11] 3,920,890

[45] Nov. 18, 1975

[54] GRAPHIC DISPLAY OF RASTER SCANNING SYSTEM OUTPUT SIGNALS

[75] Inventor: Karl-Heinz Müller, Berlin, Germany

[73] Assignee: Siemens Aktiengesellschaft, Munich, Germany

[22] Filed: June 20, 1974

[21] Appl. No.: 481,359

[30] Foreign Application Priority Data

June 25, 1973 Germany .......................... 2332684

[52] U.S. Cl. ...... 178/6.8; 178/DIG. 1; 178/DIG. 24

[51] Int. Cl.² .......................................... H04N 7/18

[58] Field of Search ......... 178/DIG. 1, 6.8, DIG. 24, 178/DIG. 3; 250/307, 309, 311, 312

[56] References Cited

UNITED STATES PATENTS

| | | | |
|---|---|---|---|
| 3,061,670 | 10/1962 | Oster | 178/6.8 |
| 3,309,461 | 3/1967 | Deutsch | 178/6.8 |
| 3,478,164 | 11/1969 | Southworth | 178/6.8 |
| 3,739,090 | 6/1973 | Heberle | 178/6.8 |
| 3,812,288 | 5/1974 | Walsh | 178/6.8 |
| 3,833,758 | 9/1974 | Ferrari | 178/DIG. 24 |

*Primary Examiner*—Howard W. Britton
*Assistant Examiner*—Michael A. Masinick
*Attorney, Agent, or Firm*—Kenyon & Kenyon Reilly Carr & Chapin

[57] ABSTRACT

A method for graphically displaying the output signals of a raster system in the form of a raster field by means of a picture tube which has a raster scan time which is less than that of the raster system. The scan time of the raster system, such as a scanning electron microscope, is selected as equal to the frame scan time of the picture tube. In addition, the picture tube raster lines are keyed on at elements thereof which are spaced apart from the beginning of the raster lines by a distance which is proportional to the distance of the raster system lines from the edge of the raster system scanning field. The graphic display of low-frequency raster operations by means of a standardized, commercial picture tube is thereby achieved.

8 Claims, 2 Drawing Figures

GRAPHIC DISPLAY OF RASTER SCANNING SYSTEM OUTPUT SIGNALS

BACKGROUND OF THE INVENTION

1. Field of the Invention

This invention relates to an improved method for graphically displaying the output signals of a raster system in the form of a raster field by means of a picture tube having a scan time which is substantially less than the scan time of the raster system. In the following paragraphs, "line time" and "scan time" refers to the time during which one line of the raster system scanning field and/or of the picture tube is scanned. The term "frame time" of the picture tube means the time during which the total frame of the picture tube is scanned once.

2. Description of the Prior Art

A typical raster system which includes a graphic display device is a scanning electron microscope. In such a system, the field of the object examined is scanned by an electron beam and signals generated thereby (representing, for example, the intensity of secondary electrons) are measured and graphically displayed by means of a synchronously driven television picture tube. Commercially available tubes have standard line and frame frequencies (in the Federal Republic of Germany, line frequency is set at 15,625 Hz, and frame frequency is standardized at 50 Hz for a 312.5-line half-frame (field) in which only every other line is recorded), and when such tubes are utilized the beam deflection system of the electron microscope must be adjusted accordingly, namely, the line time of the microscope and the picture tube must be $64 \times 10^{-6}$ seconds. Such a short line time, however, can be achieved only when the signals produced by the electron irradation of the specimen are generated rapidly enough, such as when secondary electrons are utilized to generate the signals and where the magnification required is not too large. Some operations, however, do not permit such fast scanning of the specimen since the generation of a significant signal requires the specimen element to be exposed to the electron beam for a longer period of time. Such is the case, for example, when the secondary X-ray radiation of the electron microscope is used to generate the signals, and in such a situation, the raster system frequencies, as well as the tube frequencies must be reduced considerably. In commercial tubes, however, this can only be achieved in a limited manner since the resonant circuits of the tube which generate the deflection voltages are normally tuned with the deflection coils of the picture tube to the standard frequencies. As a result, a reduction of the line and frame frequencies to, for example, one tenth or one hundredth without physical modifications cannot be achieved. Such changes instead require another tube specifically designed to operate at lower frequencies, which is a considerable additional fabrication expense.

SUMMARY OF THE INVENTION

It is therefore an object of the invention to provide an improved method for graphically displaying the output signals of a raster system in the form of a raster field by means of a picture tube having a raster scan time which is less than that of the raster system, which improved method overcomes the disadvantages of heretofore known graphic display methods and enables a standardized commercial picture tube to be utilized to display low frequency output signals of the raster system.

This and other objects are achieved by selecting the scan time of the raster system as equal to the frame scan time of the picture tube and keying the picture tube raster lines on at elements thereof which are spaced apart from the beginning of the raster lines by a distance which is proportional to the distance of the raster system lines from the edge of the raster system scanning field. In such a system, the raster system scanning time is 0.02 seconds if the picture tube utilized has a standard frame time of 0.02 seconds. Also, if the system has the same number of raster lines as the picture tube (312.5 lines), then frame formation (picture build-up) on the picture tube is achieved in 6.25 seconds. It should be noted, however, that the number of raster lines of the raster system may be chosen as desired and need not be 312.5. The information displayed by the picture tube may be stored by means of a suitable photographic recording device.

In an alternate embodiment of the invention, the raster system scan time is selected as equal to or as an integral multiple of the frame time of the picture tube, and the picture of the tube is keyed on at only one element thereof the coordinates of which are proportional to those of a raster element in the raster system scanning field. This method permits the scan time of the raster system to be increased by an even greater amount. A raster element as described herein refers to a small section of the raster line which enables an output signal to be distinguished from one of an adjacent raster element. The raster element may for example, be defined by the cross-sectional area of an electron beam which is deflected in raster-like manner.

The described invention is particularly advantageous when used with a color picture tube. In addition to the above described difficulties with respect to adjustment of the deflection circuits the convergence voltages produced by a color tube which combine the beams of the three color electron guns to form a picture element are adjusted to standardized frequencies set for commercial television sets, and such tubes thus cannot readily be adapted for use at much lower frequencies. The advantage of color display of the output information of a raster system is described in German Pat. No. 1,614,618. Aside from aesthetic attractions, more information capacity is available, more color levels may be distinguished than gray levels, and aside from chrominance additional information in the form of brightness levels is provided. Applications of color raster displays are described in the aforementioned patent. For example, different colors may be assigned to various energy levels of the X-rays released in the raster system by means of a pulse height analyzer coupled to the output terminal of an energy-dispersive X-ray detector. Moreover, different energy losses of the electrons can be allocated to different colors after passing through the specimen by means of electron irradiation. The different intensities of the transmitted electrons may also be measured and assigned different colors so that colored isodemsites are rendered visible on the picture tube.

These and other features of the invention will be described in further detail in the following detailed description.

DETAILED DESCRIPTION

Figure 1:
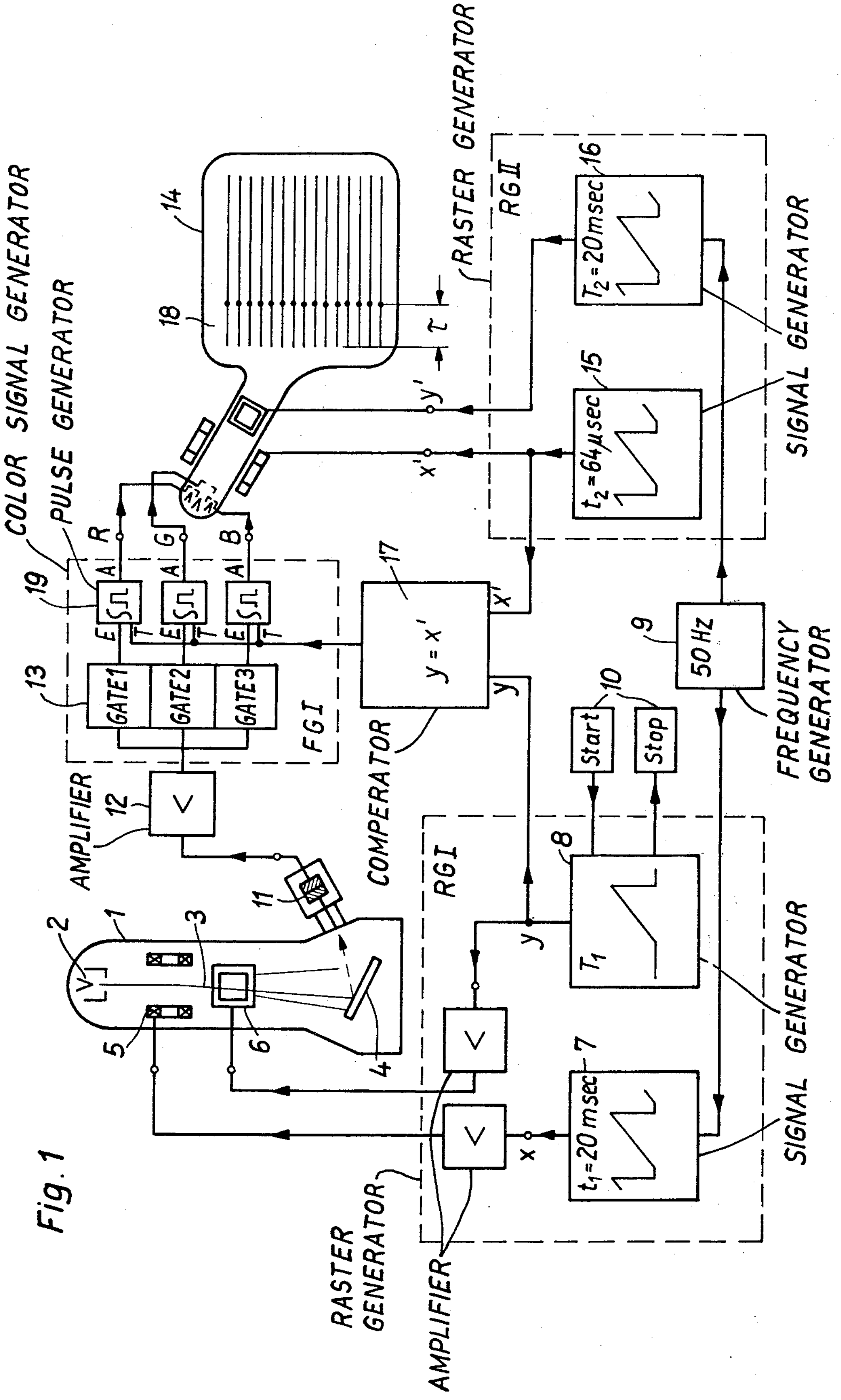
FIG. 1 is a schematic diagram of a graphic display device for carrying out one embodiment of the improved method of the invention.

Referring now to the drawings, and in particular to FIG. 1, there is shown a raster system comprising an electron microscope, generally designated 1, in which an electron source 2 generates an electron beam 3 which is focused into a fine electron probe onto a specimen 4 by means of a lens system (not shown). A pair of deflection systems 5 and 6 deflect electron beam 3 in a raster-like manner over a portion of the specimen, and are controlled by means of a raster generator RG I. The raster generator comprises saw-tooth wave signal generators illustrated as line generator 7 ($x$-axis) and line advance generator 8 ($y$-axis). Line generator 7 is triggered by means of a 50 Hz frequency generator 9, and the line time, i.e., scan time, is thus $t_1$=20 milliseconds. The line-advance time $T_1$ of line advance generator 8 is a multiple of $t_1$ and may be chosen as required. The line-advance function is initiated by a trigger 10 and stops after the completion of one sweep. Raster generator RG I thus causes electron beam 3 to scan specimen 4 once along the $x$ and $y$ coordinates.

The irradiation of specimen 4 by beam 3 generates X-rays some of which infringe upon an energy-dispersive semiconductor X-ray detector 11 which generates voltage pulses in response thereto which are transmitted to an amplifier 12. The amplitude of the pulses generated is proportional to the X-ray energy produced, while the latter is dependent upon the atomic number of the specimen material irradiated by the electron beam. The amplified output pulses of detector 11 are transmitted to a pulse-height analyzer 13 comprising a three-channel gate (gate 1, gate 2, gate 3), each gate of which passes only those pulses which correspond to a designated chemical element of the specimen. In the illustrated embodiment of the invention, three-channel gate 13 comprises part of a color signal generator FG I for a color television picture tube 14 and each gate controls the brightness intensity of the red, green and blue electron beams of tube 14. A second raster generator RG II is coupled to tube 14 which also comprises a pair of saw-tooth wave signal generators 15 and 16. Line generator 15 ($x'$-axis) operates with a scan time of $t_2 = 64$ microseconds while line advance generator 16 ($y'$-axis) operates synchronously with line generator 7 of raster generator RG I and has a line-advance time $T_2$ which is equal to scan time $t_1$(20 milliseconds). Thus, while the electron beam 3 of raster-eletron microscope 1 sweeps specimen 4 along only one line of the raster, the entire raster field of the picture screen of color tube 14 is swept.

The three electron guns of color picture tube 14 are normally keyed off, and blanking will only be cancelled when the $x'$-deflection along a line of tube 14 coincides with the $y$-deflection along specimen 4, i.e., with the position of the scanning line in electron microscope 1. Thus, a comparator 17 is provided which compares the line deflection voltage of line generator 15 with the line-advance voltage of line-advance generator 8, and one line of the specimen is displayed on picture tube 14 by means of a column of elements 18, each element of which is disposed in a different line of tube 14. The distance by which column 18 is spaced apart from the picture field edge is proportional to the distance of the imaged specimen line from the first specimen line, and thus, while the area of the specimen scanned is swept once, column 18 of the keyed-on elements travels once from left to right across the picture screen of tube 14.

Color signal generator FG I also includes three integrating pulsers 19 which generate a pulse signal at output terminals A when a keying pulse appears at the keying input T, provided that during the time elapsed between the preceding and the arriving keying pulses, at least one pulse signal appears at input terminals E. The pulses at output terminals A key on the red, green and blue electron guns of the picture tube.

Figure 2:
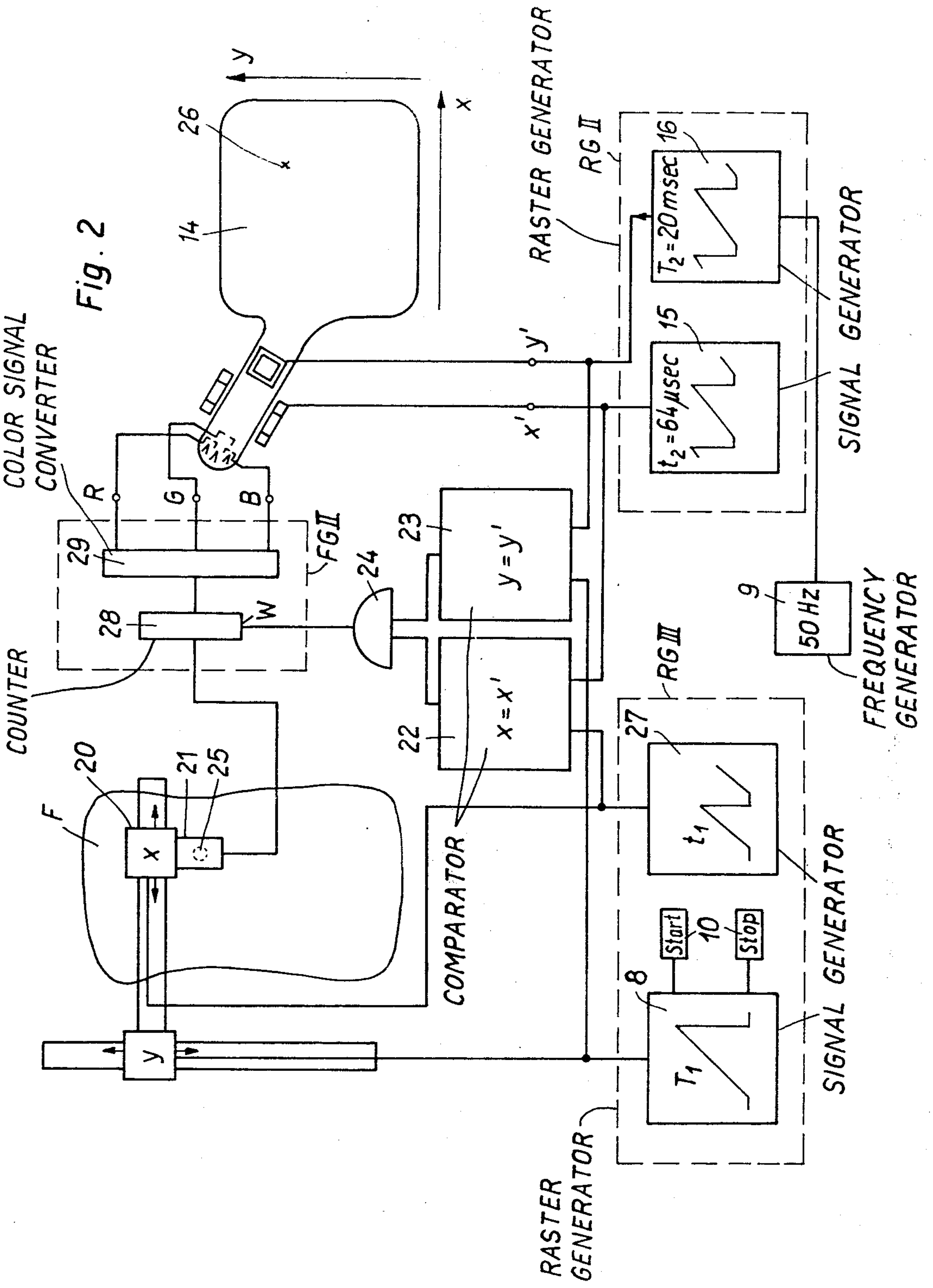
FIG. 2 is a schematic diagram of another graphic display device for carrying out another embodiment of the improved method of the invention.

The embodiment of the invention illustrated in FIG. 2 comprises a charged particle radiation measuring set in which a mechanically-controlled scanning system 20 scans, in a raster-like manner, an area F which is to be examined. This area could be, for example, the body surface of a patient given a radioactive preparation, e.g., $^J$128, for diagnostic reasons. Control of the raster system is achieved by a raster generator RG III which comprises a pair of saw-tooth wave signal generators, specifically a line generator 27 ($x$-axis) and a line-advance generator 8 ($y$-axis). The scan time $t_1$ of generator 27 is chosen so that the raster system element time is equal to the frame time of the television tube or an integral multiple thereof. The line-advance time $T_1$ of the line-advance generator 8 is a multiple of $t_1$ but can otherwise be chosen arbitrarily. The line-advance function is initiated by trigger 10 and stops after one sweep, and the area examined is thus scanned once.

Scanning system 20 guides a barrier-layer semiconductor detector 21 in a raster-like manner over area F. Each incoming charged particle generates a voltage pulse therein, the number of which per unit of time is proportional to the intensity of the examined radiation. The pulses generated are summed by a counter 28 coupled to detector 21. The counter forms part of a color signal generator FG II which controls the color electron guns of color picture tube 14. Deflection of the electron beams of the picture tube is carried out in the same manner as described with respect to the embodiment of FIG. 1, i.e., by means of raster generator RG II. The three electron guns of tube 41 are normally keyed off, and blanking can be lifted only when the $x$-axis and/or the $y$ -axis deflection of scanning system 20 corresponds to the $x'$ - and/or $y'$ - deflection of the electron beams, i.e., when an unambiguous association exists between the raster element 25 in the raster field F and the frame element 26 of the television tube. Two comparators 22 and 23 are thus provided of which comparator 22 compares the scan line deflection voltages of signal generators 27 and 15, and comparator 23 compares the line-advance voltages of generators 8 and 16. The output signals of comparators 22 and 23 are transmitted to an AND gate 24, the output signal of which is fed to the input terminal W of counter 28 causes the information stored in counter 28 to be transmitted to a color signal converter 29 and the counter 28 to be reset to zero. The color signal converter converts the output signal generated by the counter into a combination of color signals corresponding to the colors red, green and blue according to the amplitude of the output signal, and a positive modulates and unblanks the electron beams which correspond to these colors. By selecting the scan time $t_1$ of line generator 27 and line-advance time $T_1$ of line-advance generator 8 in the manner described, the picture displayed by the color picture tube is keyed on during frame time $T_2$ only at the frame element 26, the coordinates of which correspond to the raster element 25.

The described arrangement is useful for recording the heat radiation profile of a particular area, for example, a body surface. In such an application, however, semiconductor detector 21 must be replaced by an infrared detector. The output signal of such a detector is then in the form of a voltage, the amplitude of which is proportional to the intensity of the measured infrared radiation, and may be converted into a digital signal by means of an analog-to-digital converter and further processed by color generator FG II shown in FIG. 2. Instead of an infrared detector which scans the examined area in raster-like fashion, a stationary infrared detector may also be utilized. Scanning of the examined area would then be effected by means of mechanically guided mirrors.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a method for graphically displaying the output signals of a raster system in the form of a raster field by means of a picutre tube having a raster scan time which is less than that of the raster system, the improvement comprising selecting the scan time of the raster system as equal to the frame scan time of the picture tube, and keying the picture tube raster lines on at elements thereof which are spaced apart from the beginning of the raster lines by a distance which is proportional to the distance of the raster system lines from the edge of the raster system scanning field.

2. The method of claim 1, wherein said output signals of said raster system are displayed by means of a color picture tube.

3. The method of claim 1, wherein said output signals of said raster system are generated by a scanning electron microscope.

4. The method of claim 1, wherein said output signals of said raster system are generated by a radiation measuring system including a mechanically controlled scanner for determining the radiation profile of a body surface.

5. In a method for graphically displaying the output signals of a raster system in the form of a raster field by means of a picture tube having a raster scan time which is less than that of the raster system, the improvement comprising selecting the scan time of the raster system as equal to or an integral multiple of the picture tube frame scan time, and keying the picture tube display on at only one element thereof the orthogonal coordinates of which are proportional to those of a raster element in the raster system scan field.

6. The method of claim 5, wherein said output signals of said raster system are displayed by means of a color picture tube.

7. The method of claim 5, wherein said output signals of said raster system are generated by a scanning electron microscope.

8. The method of claim 5, wherein said output signals of said raster system are generated by a radiation measuring system including a mechanically controlled scanner for determining the radiation profile of a body surface.

* * * * *